(12) United States Patent
Karau

(10) Patent No.: US 10,486,344 B2
(45) Date of Patent: *Nov. 26, 2019

(54) ADJUSTABLE LOCATOR RETAINING WALL BLOCK AND MOLD APPARATUS

(71) Applicant: PAVESTONE, LLC, Atlanta, GA (US)

(72) Inventor: William H. Karau, Southlake, TX (US)

(73) Assignee: Pavestone, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,313

(22) Filed: May 31, 2018

(65) Prior Publication Data
US 2018/0272574 A1    Sep. 27, 2018

Related U.S. Application Data

(63) Continuation of application No. 15/688,784, filed on Aug. 28, 2017, now Pat. No. 9,999,993, which is a continuation of application No. 15/074,830, filed on Mar. 18, 2016, now Pat. No. 9,744,697, which is a continuation of application No. 14/311,194, filed on Jun. 20, 2014, now abandoned.

(60) Provisional application No. 61/838,205, filed on Jun. 21, 2013.

(51) Int. Cl.
| | | |
|---|---|---|
| *E02D 29/02* | (2006.01) | |
| *B29C 41/36* | (2006.01) | |
| *E04C 1/00* | (2006.01) | |
| *B28B 7/00* | (2006.01) | |
| *B28B 7/18* | (2006.01) | |
| *E04B 2/32* | (2006.01) | |
| *E04C 1/39* | (2006.01) | |
| *E04B 2/02* | (2006.01) | |

(52) U.S. Cl.
CPC ............ *B29C 41/36* (2013.01); *B28B 7/00* (2013.01); *B28B 7/0097* (2013.01); *B28B 7/183* (2013.01); *E02D 29/02* (2013.01); *E02D 29/025* (2013.01); *E02D 29/0266* (2013.01); *E04B 2/32* (2013.01); *E04C 1/00* (2013.01); *E04C 1/395* (2013.01); *E04B 2002/0208* (2013.01); *E04B 2002/0269* (2013.01)

(58) Field of Classification Search
CPC ... E02D 29/025; E02D 29/0266; E02D 29/02; E04C 1/00; E04C 1/395; B29C 41/36; E04B 2/32; E04B 2002/0208; E04B 2002/0269; B28B 7/183; B28B 7/0097; B28B 7/00

See application file for complete search history.

(56) References Cited

U.S. PATENT DOCUMENTS

| | | | | |
|---|---|---|---|---|
| 6,994,495 B1 * | 2/2006 | Carey | ............... | E02D 29/025 405/284 |
| 2008/0260474 A1 * | 10/2008 | Koster | ............... | E04C 1/395 405/284 |
| 2011/0162314 A1 * | 7/2011 | Leach | ............... | E02D 29/025 52/609 |

* cited by examiner

*Primary Examiner* — Patrick J Maestri
(74) *Attorney, Agent, or Firm* — Jackson Walker LLP; Christopher J. Rourk

(57) ABSTRACT

A system of retaining wall blocks, a method of assembling a retaining wall block assembly, and a mold for manufacturing retaining wall blocks having adjustable engagement configurations.

20 Claims, 10 Drawing Sheets

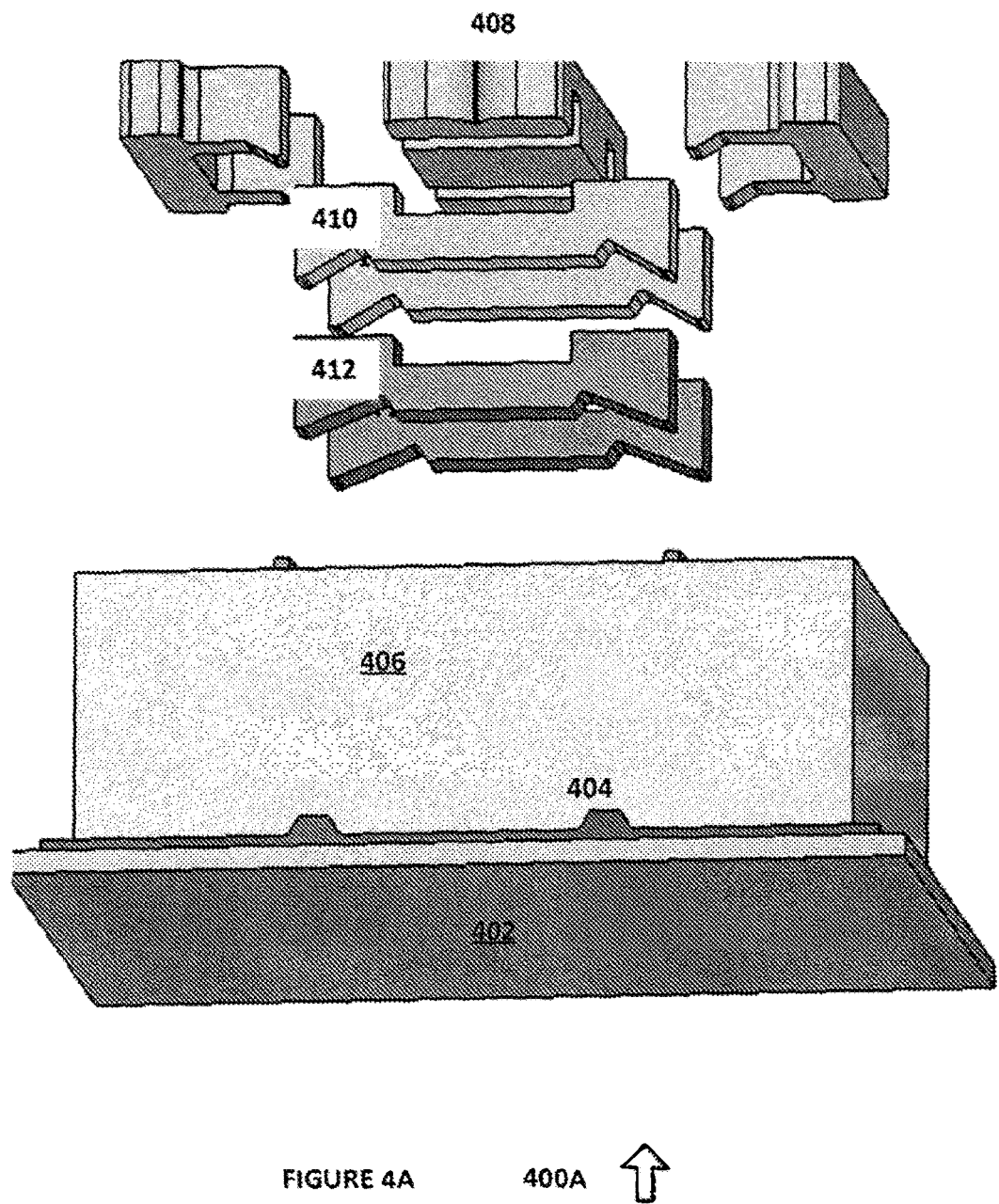
FIGURE 4A    400A

ADJUSTABLE LOCATOR RETAINING WALL BLOCK AND MOLD APPARATUS

RELATED APPLICATIONS

The present application is a continuation of U.S. patent application Ser. No. 15/688,784 filed Aug. 28, 2017, which is a continuation of U.S. patent application Ser. No. 15/074,830 filed Mar. 18, 2016, now patented under U.S. Pat. No. 9,744,697 on Aug. 29, 2017, which is a continuation of U.S. patent application Ser. No. 14/311,194, filed Jun. 20, 2014, which claims priority to and benefit of U.S. Provisional Patent Application No. 61/838,205, filed Jun. 21, 2013, which are hereby incorporated by reference for all purposes as if set forth herein in their entireties.

TECHNICAL FIELD

The present disclosure relates to retaining wall blocks, and more specifically to a retaining wall having adjustable positioning engagements and a mold for manufacturing such.

BACKGROUND OF THE INVENTION

Retaining wall blocks can be manufactured and arranged in a variety of different ways.

SUMMARY OF THE INVENTION

A system of retaining wall blocks, a method of assembling a retaining wall block assembly, and a mold for manufacturing retaining wall blocks having adjustable engagement configurations.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIGS. 4A through 4B are diagrams of a mold shoe in accordance with an exemplary embodiment of the present disclosure;

DETAILED DESCRIPTION OF THE INVENTION

Figure 1A:
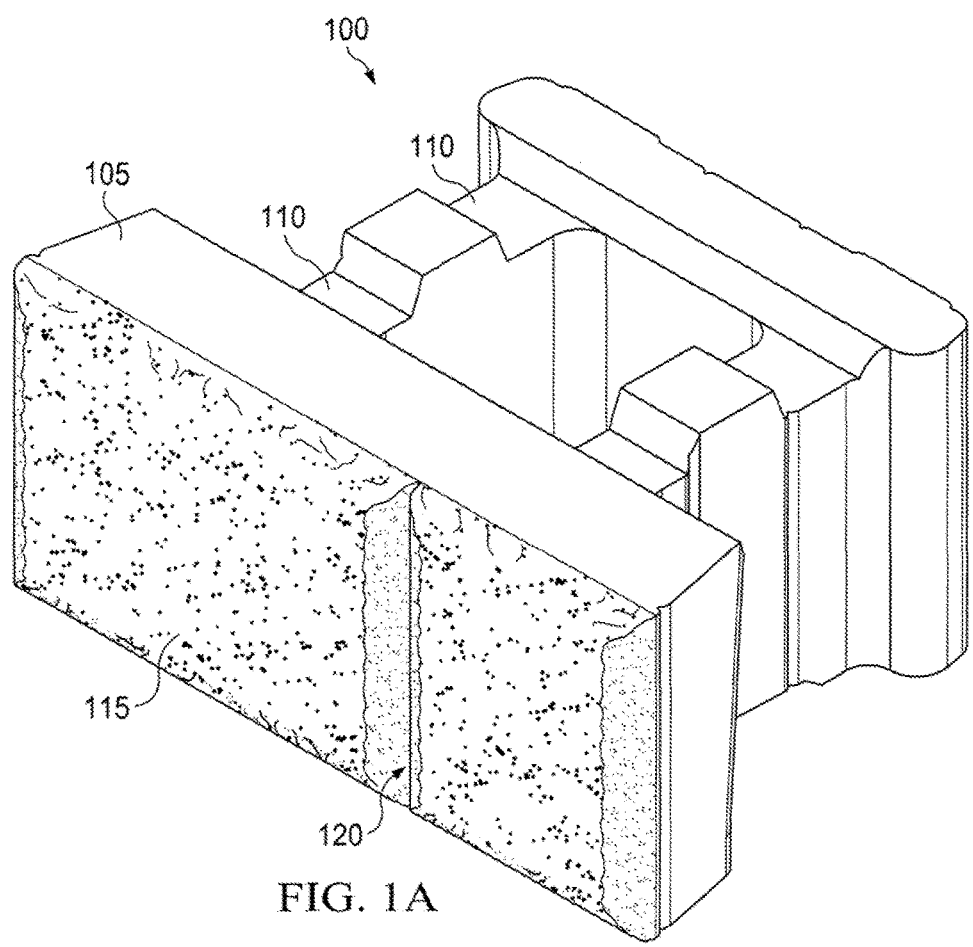
FIGS. 1A through 1C are diagrams of a retaining wall block in accordance with in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1B:
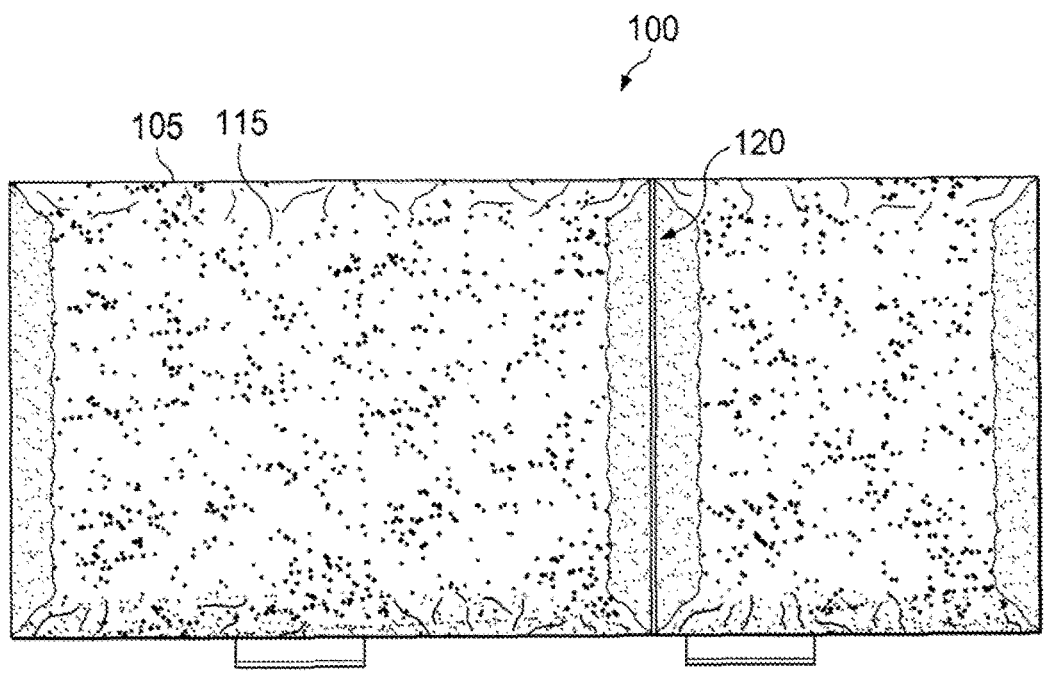
Figure 1C:
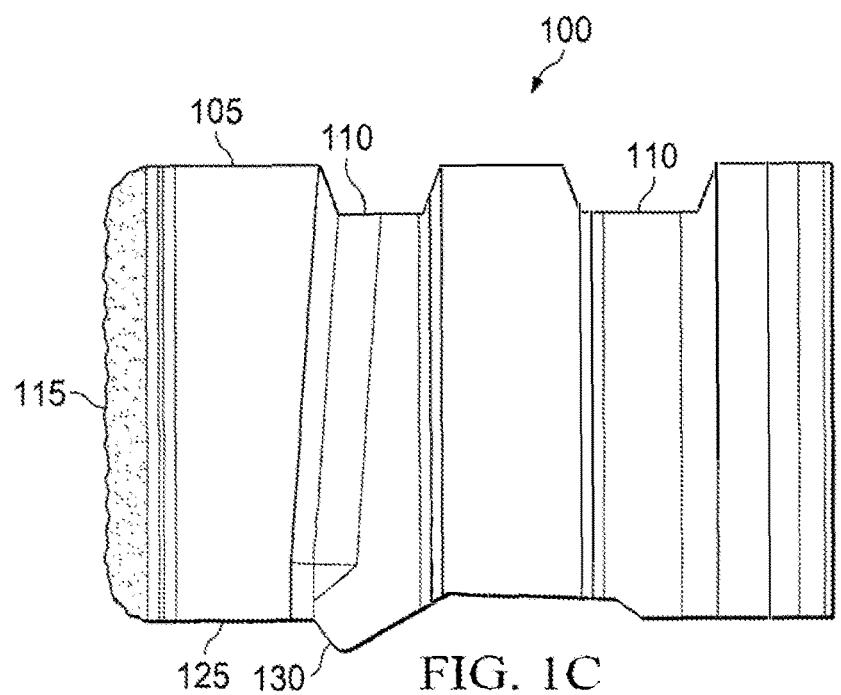

FIGS. 1A through 1C are diagrams of a retaining wall block 100 in accordance with an exemplary embodiment of the present disclosure. Retaining wall block 100 can be formed from masonry, concrete or other suitable materials, using a wet cast process, a dry cast process or other suitable processes. As shown in FIG. 1A, retaining wall block 100 includes a top face 105, engagement cavity 110, and textured front face 115. Textured front face 115 can be formed by splitting retaining wall block 100 from a second retaining wall block 100, as discussed in greater detail below. As shown in FIG. 1B, which is a front view of retaining wall block 100, front face 115 includes a false joint 120 for aesthetic purposes.

As shown in FIG. 1C, which is a side view of retaining wall block 100, retaining wall block 100 further includes bottom surface 125 having at least one engagement protrusion 130. Engagement protrusion 130 is configured to interface with engagement cavity 110 of an underlying retaining wall block 100. Furthermore, the front engagement cavity 110 is offset from the location of engagement protrusion 130, so as to result in a staggered incline as successive rows of retaining wall blocks 100 are formed. In one embodiment of the present disclosure, the incline of successive rows of retaining wall blocks 100 is generally vertical with no staggering.

Figure 2A:
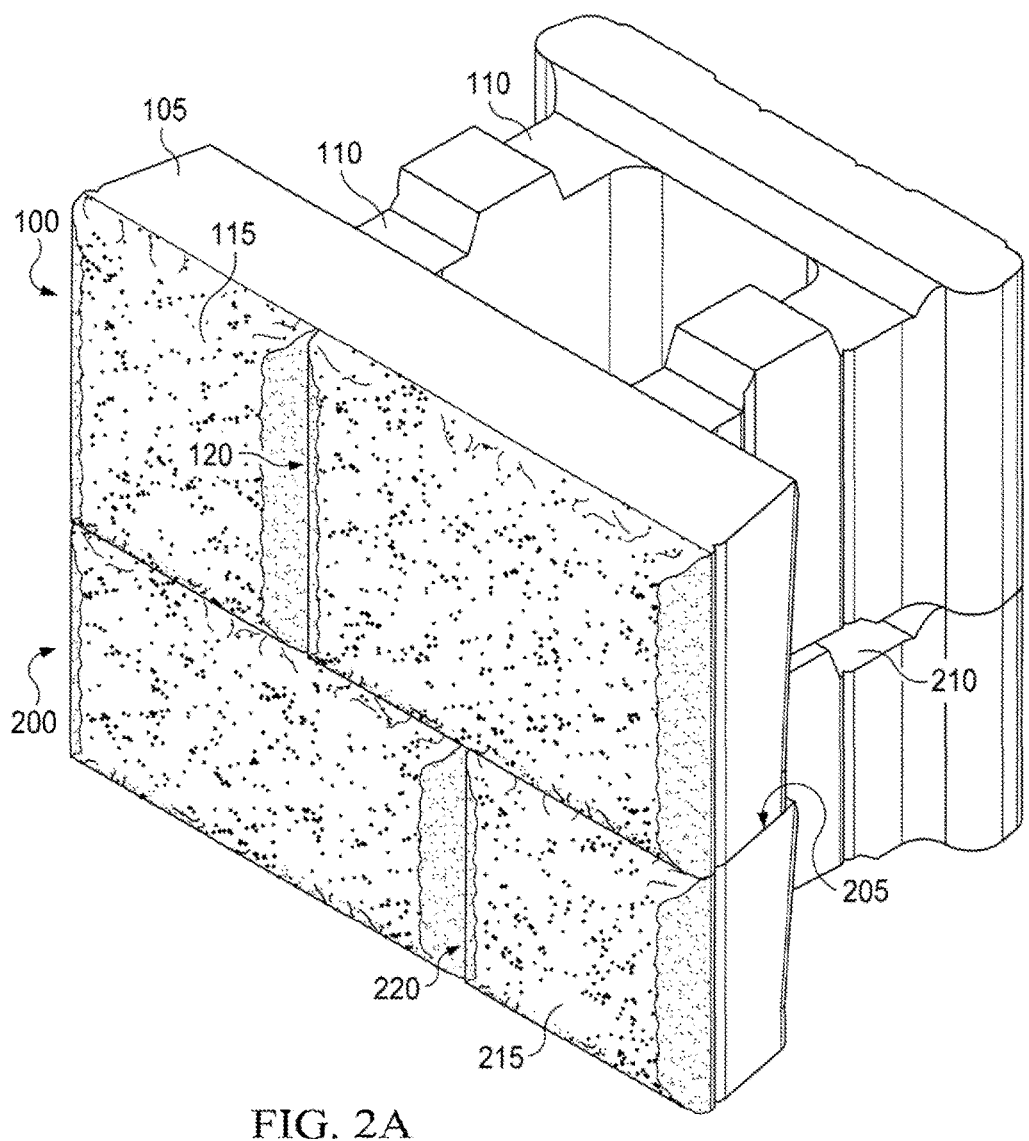
FIGS. 2A through 2C are diagrams of retaining wall blocks in accordance with in accordance with an exemplary embodiment of the present disclosure.
Figure 2B:
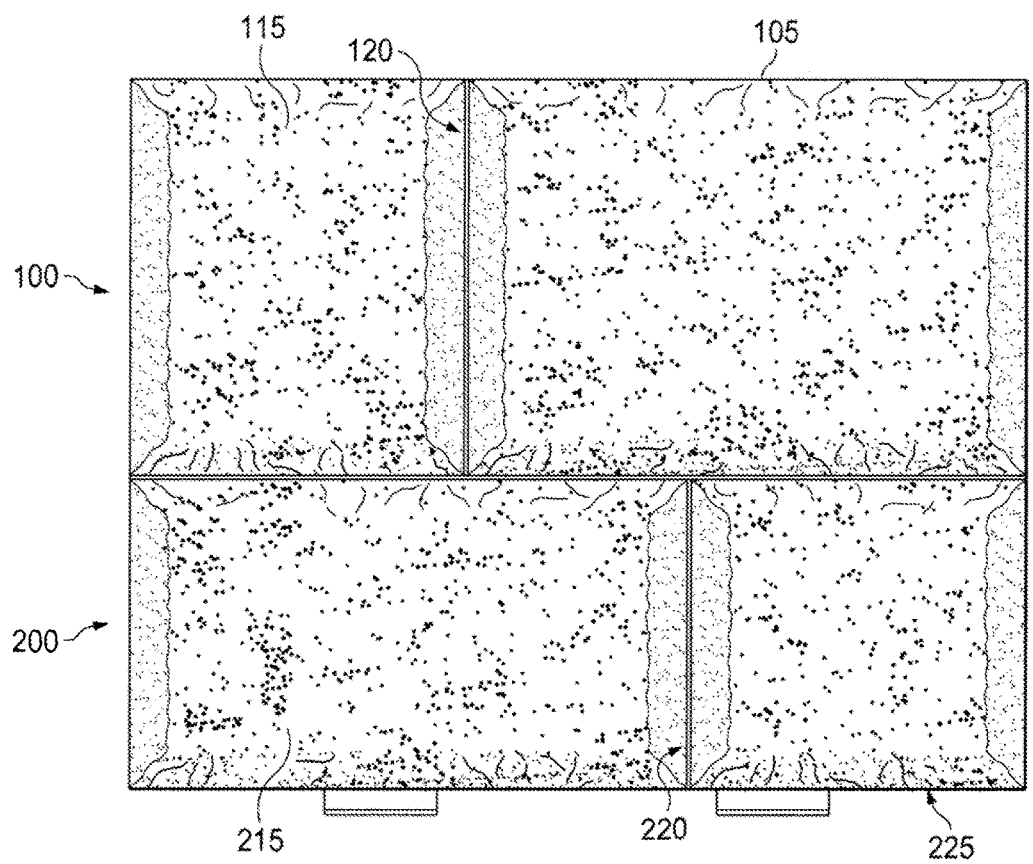
Figure 2C:
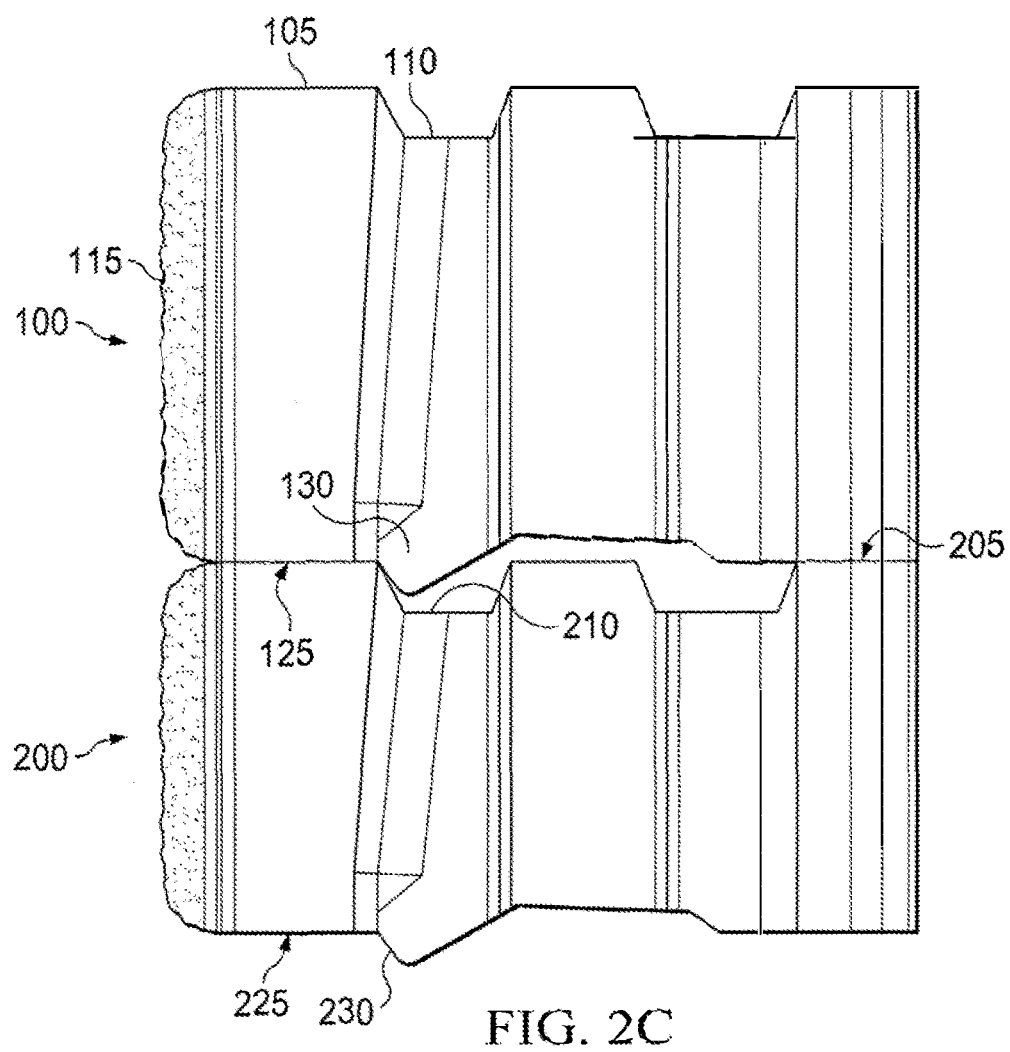

FIGS. 2A through 2C are diagrams of two engaged retaining wall blocks 100 and 200, in accordance with an exemplary embodiment of the present disclosure. As shown in FIG. 2A, retaining wall blocks 100 and 200 include top faces 105 and 205, respectively, engagement cavities 110 and 210, respectively, and textured front faces 115 and 215, respectively. As previously discussed, retaining wall blocks 100 and 200 can also have false joints 120 and 220, respectively, for aesthetic purposes, as shown in FIG. 2B. Likewise, other suitable false joints can also or alternatively be used.

In one embodiment of the present disclosure, first retaining wall block 100 is disposed onto a top surface 205 of a second retaining wall block 200. As shown in FIG. 2C, first retaining wall block 100 can positioned so that engagement protrusions 130 align with and fit into engagement cavity 210 of second retaining wall block 200.

In one embodiment of the present disclosure, the angle and configuration of engagement notches 110 and 210 and engagement members 130 and 230 can be varied to allow the blocks 100, 200 to be assembled with an offset. In one exemplary embodiment of the present disclosure, the angle of engagement notches 110 and 210 can be between about 30 degrees and about 90 degrees. Likewise, the angle of engagement members 130 and 230 can be between about 30 degrees and about 90 degrees.

Figure 3A:
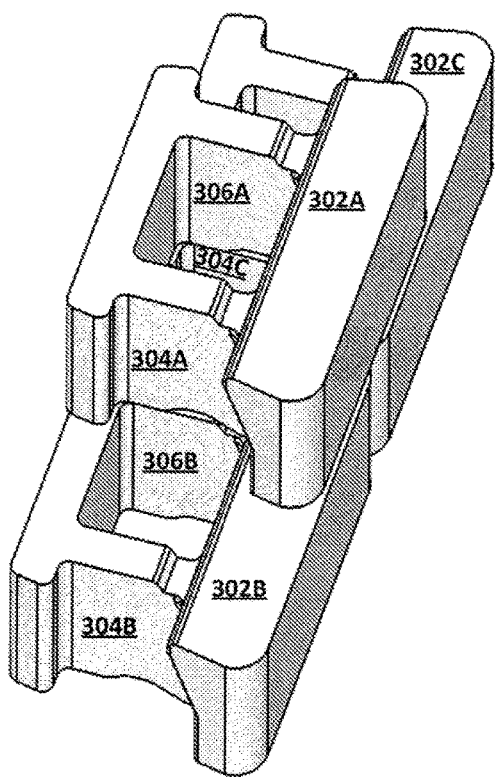
FIGS. 3A through 3B are diagrams of retaining wall blocks in accordance with in accordance with an exemplary embodiment of the present disclosure.
Figure 3B:
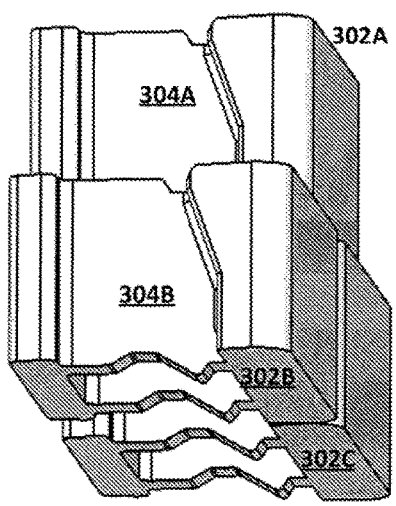

FIGS. 3A and 3B are diagrams of retaining wall blocks 302A, 302B and 302C, in accordance with an exemplary embodiment of the present disclosure. FIG. 3A shows an overhead view of retaining wall blocks 302A, 302B and 302C, with block 302A centered over blocks 302B and 302C. In addition, internal support 304A of block 302A is aligned with internal support 306B of block 302B, and internal support 306A of block 302A is aligned with internal support 304C of block 302C.

FIG. 3B shows an underside view of retaining wall blocks 302A, 302B and 302C. As can be seen, the blocks are H-shaped, and each include engagement cavities on a top surface and engagement protrusions on a bottom surface that can interlock with the engagement cavities at the top of underlying blocks. The location of the engagement cavities and engagement protrusions is adjustable, as previously described, so as to allow the angle of incline for the wall to be selected.

Figure 4B:
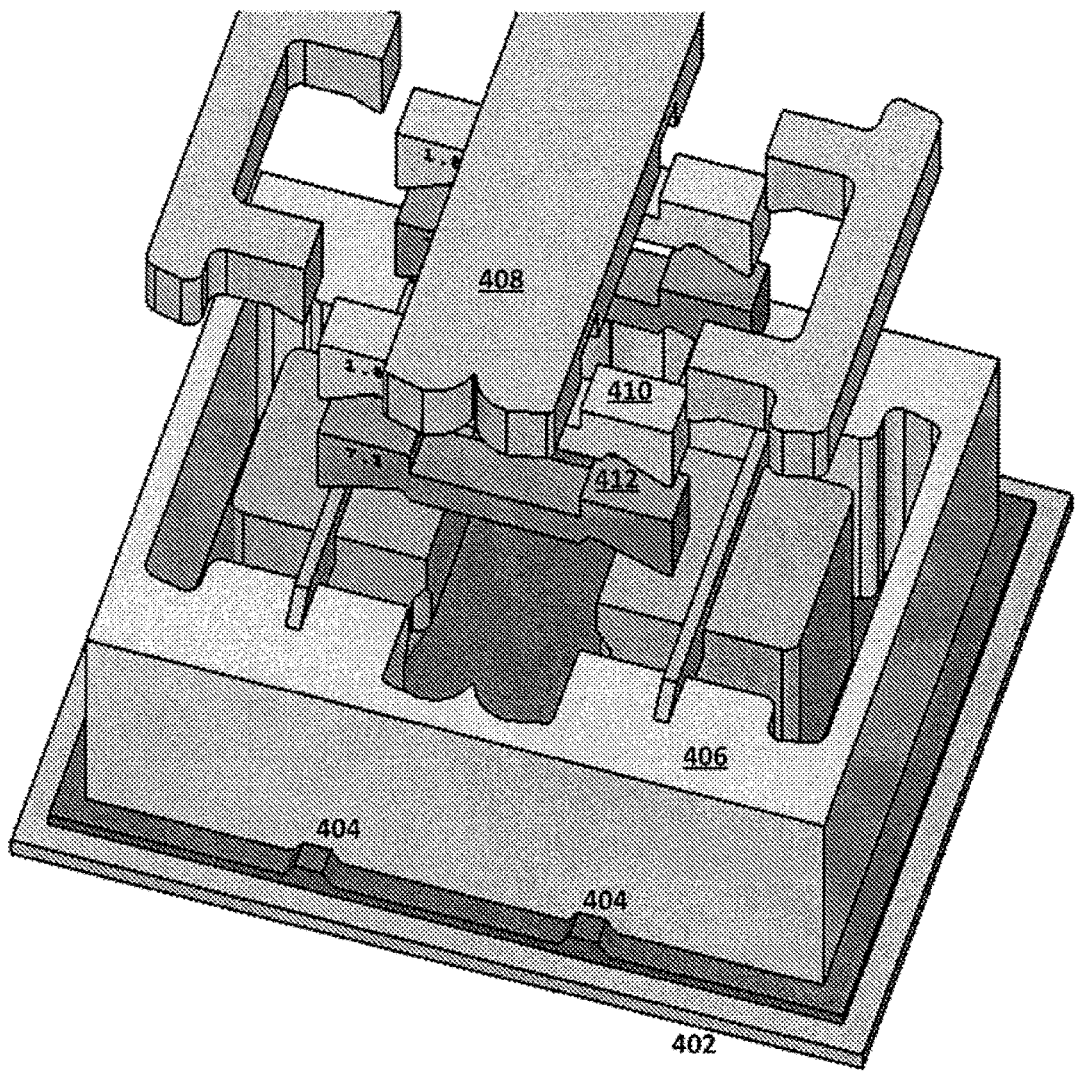

FIG. 4A through 4B are diagrams 400A and 400B of a mold for manufacturing retaining wall blocks, in accordance with an exemplary embodiment of the present disclosure. The mold can be formed from steel or other suitable materials, and can be configured to handle masonry, cement or other suitable materials.

As shown in FIGS. 4A through 4B, the mold includes a base portion 402 having a ridge 404, which is used to form the notch at the top of the block. The body 406 of the mold is placed on top of the base portion, and a shoe 408 with adjustable inserts 410 and 412 are provided that can be used to create blocks with different angles of incline, such as to allow a wall designer to specify an angle of incline. Inserts 410 and 412 interlock with shoe 408, such as by using a mechanical interlock device, screws or in other suitable manners.

Figure 5:
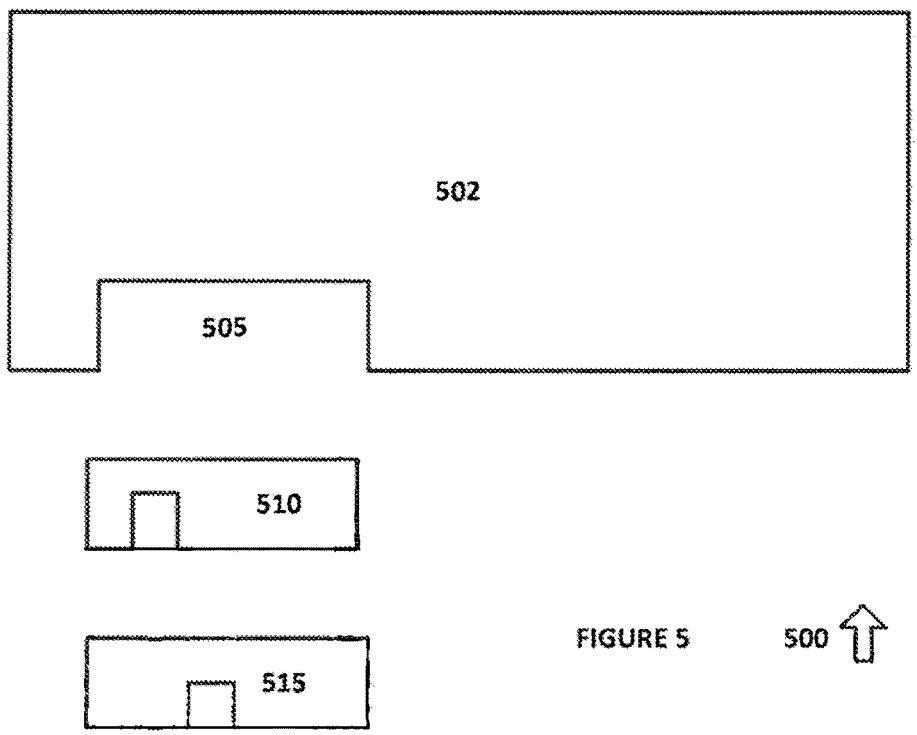
FIG. 5 is a diagram of a mold shoe in accordance with an exemplary embodiment of the present disclosure.

FIG. 5 is a diagram of a mold shoe 500 in accordance with an exemplary embodiment of the present disclosure. Mold shoe 500 includes body 502 and insert channel 505 that can be used to change the location of the at least one engagement protrusion. For example, by using insert A 510, the location of the at least one engagement protrusion is farther back than when using insert B 515. The location of the at least one engagement protrusion defines the incline of the wall, such as to allow the incline to be adjusted based on design specifications.

Figure 6:
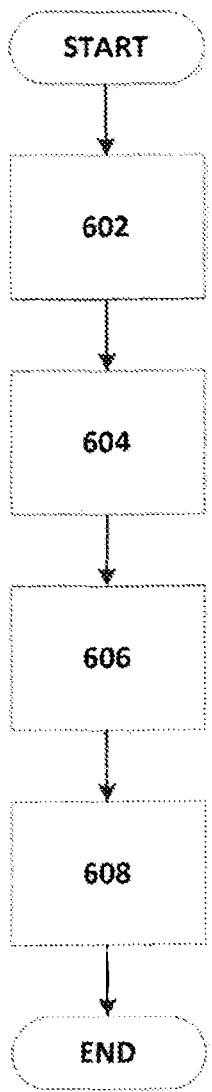
FIG. 6 is a flow chart of a method for manufacturing a retaining wall with an adjustable incline angle, in accordance with an exemplary embodiment of the present disclosure.

FIG. 6 is a flow chart of a method for manufacturing a retaining wall with an adjustable incline angle, in accordance with an exemplary embodiment of the present disclosure. Method 600 begins at 602, where an inset associated with a selected angle of incline is selected and incorporated into a mold. In one exemplary embodiment, the inset can be configured to interlock with a shoe of a mold assembly, such as by using a mechanical interlock, can be secured using screws or can otherwise be attached to the mold assembly. The method then proceeds to 604.

At 604, the mold is filled with masonry, cement or other suitable materials.

At 606, the shoe is used to compress the material into the mold and the shoe and mold is then removed.

At 608, the material is allowed to harden.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A concrete block comprising:
a forward engagement cavity located on a top surface;
a rear engagement cavity located on the top surface;
a front member having a height, a width, a front surface and a rear surface;
a rear member oriented parallel to the front member; and
two transverse members connecting the front member to the rear member and forming a core therebetween;
wherein the transverse members are oriented perpendicular to the front and rear members;
wherein the transverse members are spaced such that stacking multiple courses of the concrete blocks in an overlap running bond causes the transverse members to superpose each other;
wherein at least one transverse member comprises an integrally-formed engagement protrusion located on a bottom surface adjacent to the front member and adjacent to an integrally formed cavity.

2. The concrete block of claim 1, wherein the sides of the integrally-formed engagement protrusion are coplanar with the sides of one of the transverse members.

3. The concrete block of claim 1, wherein the sides of the integrally-formed engagement protrusion are coplanar with at least one side of one of the transverse members.

4. The concrete block of claim 1 wherein the transverse members are spaced apart from each other.

5. The concrete block of claim 1 wherein the transverse members are spaced such that stacking multiple courses of the concrete blocks causes the transverse members to superpose each other.

6. The concrete block of claim 1 wherein two or more of the transverse members are spaced such that stacking two or more courses of the concrete blocks in an overlap running bond causes the transverse members to superpose each other.

7. The concrete block of claim 1, wherein the sides of the integrally-formed engagement protrusion are coplanar with the sides of the transverse members.

8. The concrete block of claim 1, wherein the sides of the integrally-formed engagement protrusion are coplanar with at least one side of the transverse members.

9. The concrete block of claim 1, wherein the sides of the integrally-formed engagement protrusion are parallel with each other.

10. The concrete block of claim 1, wherein the sides of the integrally-formed engagement protrusion are at least partially parallel with each other.

11. A wall comprising:
a plurality of concrete blocks, each concrete block including:
a forward engagement cavity located on a top surface;
a rear engagement cavity located on the top surface;
a front member having a height, a width, a front surface and a rear surface;
a rear member oriented parallel to the front member; and
two transverse members connecting the front member to the rear member and forming a core therebetween;
wherein the transverse members are oriented perpendicular to the front and rear members;
wherein the transverse members are spaced such that stacking multiple courses of the concrete blocks in the wall in an overlap running bond causes the transverse members to superpose each other;
wherein at least one transverse member comprises an engagement protrusion located on a bottom surface adjacent to the front member and adjacent to a cavity.

12. The wall of claim 11, wherein the sides of the engagement protrusion are coplanar with the sides of one of the transverse members.

13. The wall of claim 11, wherein the sides of the engagement protrusion are coplanar with at least one side of one of the transverse members.

14. The wall of claim 11 wherein the transverse members are spaced apart from each other.

15. The wall of claim 11 wherein the transverse members are spaced such that stacking multiple courses of the concrete blocks causes the transverse members to superpose each other.

16. The wall of claim 11 wherein two or more of the transverse members are spaced such that stacking two or more courses of the concrete blocks in an overlap running bond causes the transverse members to superpose each other.

17. The wall of claim 11, wherein the sides of the engagement protrusion are coplanar with the sides of the transverse members.

18. The wall of claim 11, wherein the sides of the engagement protrusion are coplanar with at least one side of the transverse members.

19. The wall of claim 11, wherein the sides of the engagement protrusion are parallel with each other.

20. The wall of claim 11, wherein the sides of the engagement protrusion are at least partially parallel with each other.

* * * * *